United States Patent
Lowe et al.

(10) Patent No.: US 7,258,539 B2
(45) Date of Patent: Aug. 21, 2007

(54) MOLDING PRESS WITH QUICK-CHANGE MOLD MOUNTING SYSTEM

(75) Inventors: Vernon John Lowe, Greenback, TN (US); Ian Jonathan Davies, Vandalia, OH (US)

(73) Assignee: Tooling Technology, LLC, Ft. Loramie, OH (US)

( * ) Notice: Subject to any disclaimer, the term of this patent is extended or adjusted under 35 U.S.C. 154(b) by 359 days.

(21) Appl. No.: 10/919,082

(22) Filed: Aug. 16, 2004

(65) Prior Publication Data

US 2006/0034970 A1 Feb. 16, 2006

(51) Int. Cl.
*B29C 33/30* (2006.01)

(52) U.S. Cl. .................. 425/192 R; 425/195

(58) Field of Classification Search ........... 425/190, 425/192 R, 193, 195
See application file for complete search history.

(56) References Cited

U.S. PATENT DOCUMENTS

| | | | |
|---|---|---|---|
| 4,500,275 A | | 2/1985 | Ruhl |
| 4,671,764 A | * | 6/1987 | Hehl ..................... 425/595 |
| 4,773,839 A | * | 9/1988 | Case et al. ................ 425/193 |
| 4,790,739 A | * | 12/1988 | Manfredi ................ 425/192 R |
| 5,096,405 A | * | 3/1992 | Pace et al. ............. 425/192 R |
| 5,259,742 A | * | 11/1993 | Ichikawa et al. ....... 425/192 R |
| 5,773,041 A | | 6/1998 | Singh et al. |
| 5,785,908 A | | 7/1998 | Bott et al. |
| 6,379,072 B1 | | 4/2002 | Brown et al. |
| 6,572,356 B2 | * | 6/2003 | Seger ..................... 425/192 R |

\* cited by examiner

*Primary Examiner*—James P. Mackey
(74) *Attorney, Agent, or Firm*—Jacox, Meckstroth & Jenkins

(57) ABSTRACT

A set of injection mold sections are supported and secured to parallel spaced platens of an injection molding press by quick-change locking couplers including a plurality of projecting knobs or studs on each mold section. The studs are received within corresponding cylinders each having a tapered seat which engages a mating surface on the stud. Each cylinder also supports circumferentially spaced balls movable between locked positions engaging enlarged head portions of the studs and retracted released positions in response to axial movement of a spring biased piston within a housing. The pistons are moved to released positions in response to pressurized air supplied simultaneously to the housings. The locking couplers may be recessed within an adapter plate disposed between a mold section and the supporting platen, and the adapter plate has a pattern of threaded holes for mounting a conventional mold section.

17 Claims, 4 Drawing Sheets

MOLDING PRESS WITH QUICK-CHANGE MOLD MOUNTING SYSTEM

BACKGROUND OF THE INVENTION

This invention relates to the mounting of injection mold sections on the parallel spaced platens of an injection molding press and for attaching each mold section with a quick-change mounting system in order to provide for quickly interchanging injection molds with minimum down time of the molding press. One form of quick-change mounting system is produced by Tecnomagnete SpA in Milan, Italy. This system involves the use of electromagnetic plates which mount on the press platens and support ferrous mold sections with magnetic attraction after the mold sections have been properly located on the plates. Mold sections have also been mounted on press platens with expandable tapered collets operated by fluid cylinders, for example, as disclosed in U.S. Pat. No. 5,773,041. Quick connect couplers have also been used to provide a connection with ejector pins for a mold ejector plate, for example, as disclosed in U.S. Pat. No. 6,379,072. In addition, laterally sliding cam or wedge blocks or plates operated by hydraulic cylinders or screw jacks have been used to secure mold sections to their corresponding platens after the mold sections are properly located, for example, as disclosed in U.S. Pat. No. 4,500,275 and U.S. Pat. No. 5,785,908.

With any quick-change mold mounting system, it is desirable for the system to provide not only for a high clamping force securing each mold section to its supporting press platen, but also for precisely and quickly locating each mold section on its supporting platen. It is also desirable for a quick-change mold mounting system to be able to accommodate molds of various sizes and types as well as molds with non-magnetic surfaces. In addition, it is desirable for a quick-change mold mounting system to provide for mounting and attaching mold sections with conventional mounting and locating means such as clamping brackets with threaded bolts or screws and conventional locating pins.

SUMMARY OF THE INVENTION

The present invention is directed to an improved quick-change mounting system for attaching the mating sections of a mold defining at least one cavity for producing plastic parts and which provides all of the desirable features and advantages mentioned above. That is, the quick-change mold mounting system of the invention provides for a high clamping force between each mold section and its supporting press platen and also provides for precisely and quickly locating the mold section on the platen. In addition, the mounting system of the invention may be used with metal and non-metal mold sections or with mold sections having non-magnetic surfaces. The quick-change mold mounting system of the invention further accommodates molds of various sizes and types and may also be used for mounting mold sections with conventional clamping screws or bolts and locating pins.

In accordance with a preferred embodiment of the invention, the quick-change mounting system of the invention includes a plurality of spaced quick-change locking couplers connecting each mold section to its supporting platen. Each of the locking couplers includes a cylinder having peripherally spaced holes supporting a plurality of circumferentially spaced balls for corresponding radial movement. A plurality of projecting studs having parallel axes perpendicular to the platens are connected to each mold section, and each stud has a tapered base portion and an enlarged head portion which projects into a corresponding cylinder. A cup-shaped piston surrounds each cylinder and has a recess for receiving the balls in a released position, and a compression spring urges the piston axially within the housing to a locked position with the balls engaging the head portion of the corresponding stud. The pistons within the housings are moved axially and simultaneously against the corresponding springs to released positions where the balls are received in the recesses, thereby releasing the studs and permitting removal of each mold section from its supporting platen. The locking couplers may be recessed within each platen or within an adapter plate secured to the platen.

Other features and advantages of the invention will be apparent from the following description, the accompanying drawing and the appended claims.

DESCRIPTION OF THE PREFERRED EMBODIMENT

Figure 1:
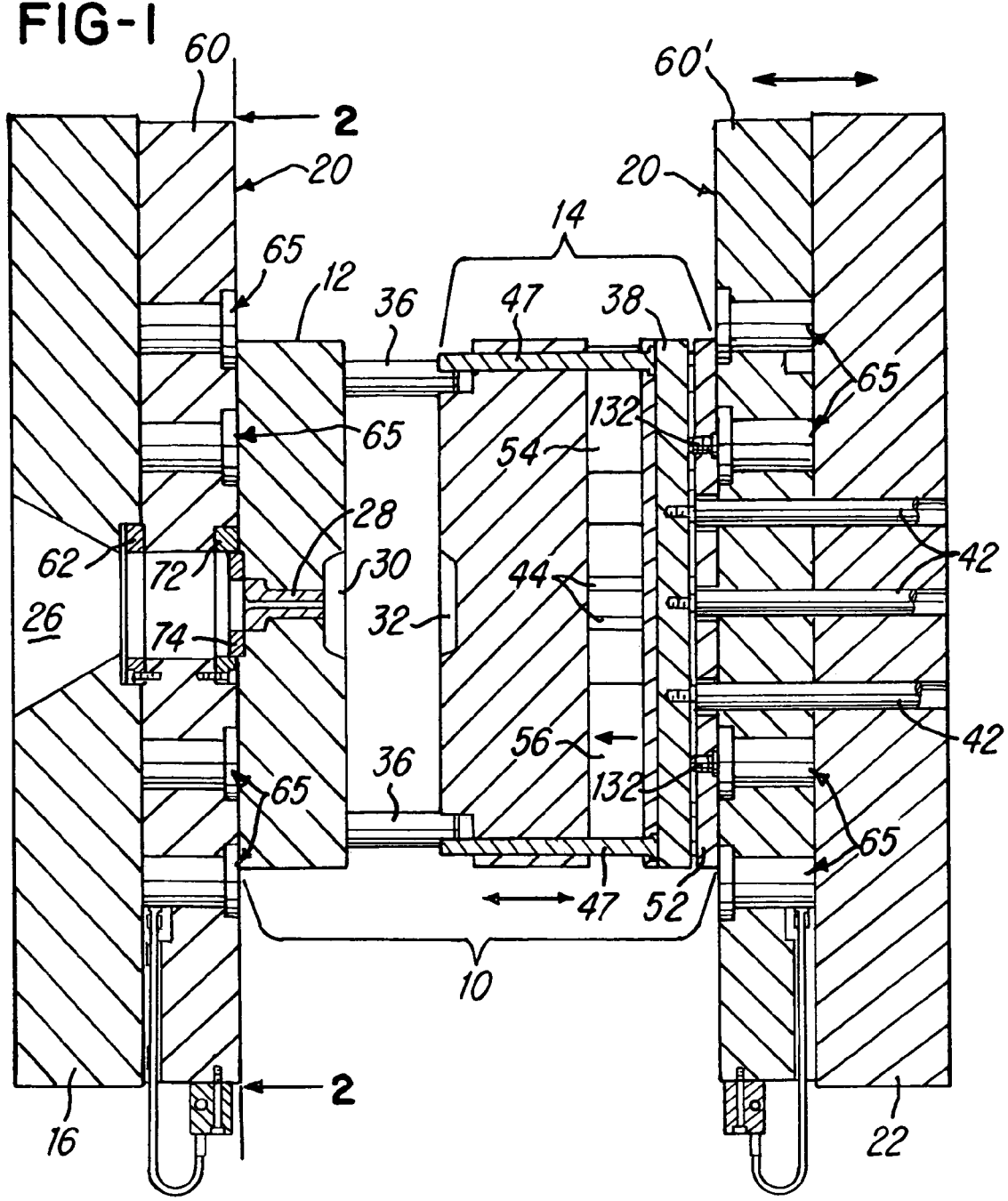
FIG. 1 is a vertical axial section through a set of press platens and a mold having opposing mold sections each mounted on its corresponding platen with a quick-change mounting system constructed in accordance with the invention.

Referring to FIG. 1, an injection mold assembly 10 includes a stationary mold section 12 and a movable mold section 14. The mold section 12 is mounted on a stationary platen 16 of an injection molding machine or press by a quick-change mounting system 20 constructed in accordance with the invention. The movable mold section 14 is mounted on a movable platen 22 of the press by another quick-change mounting system 20. The stationary platen 16 has a central tapered opening 26 adapted to receive the injection nozzle of the injection molding press, and the stationary mold section 12 supports a conventional sprue bushing 28 which directs molten plastics material from the nozzle into mating and opposing cavities 30 and 32 defined within the mold sections 12 and 14, respectively.

In a conventional manner, the mold section 14 is supported for sliding movement on four corner guide posts or pins 36 when the mold section 14 moves with the platen 22 between a closed position and an open position (FIG. 1). Also in a conventional manner, the mold section 14 may be provided with an ejector plate 38 which is supported for reciprocating movement relative to the platen 22 by a set of ejector support rods 42 extending through holes within the platen 22 and connected to a fluid actuated cylinder (not shown). The ejector plate 38 carries a set of ejector pins 44 which extend through holes within the mold section 14 to eject molded parts from the cavities 30 and 32. A set of guide rods 47 cooperate to support the ejector plate 38 for reciprocating movement relative to the mold section 14 in response to axial movement of the rods 42. The mold section 14 also includes a mold mounting plate 52 which is rigidly connected by a set of posts 54 and 56.

In accordance with the present invention, the quick-change mounting system 20 for the mold section 12 includes an adapter plate 60 (FIGS. 1 and 2) which is precisely located on the stationary platen 16 by a hardened locating ring 62 secured to the adapter plate 60 and partially received within a counterbore formed within the center portion of the platen 16. The adapter plate 60 is secured or anchored to the stationary platen 16 by a set of bolts or screws which extend through counterbored holes 64 (FIG. 2) within the plate 60 and are threaded into the platen 16.

Figure 2:
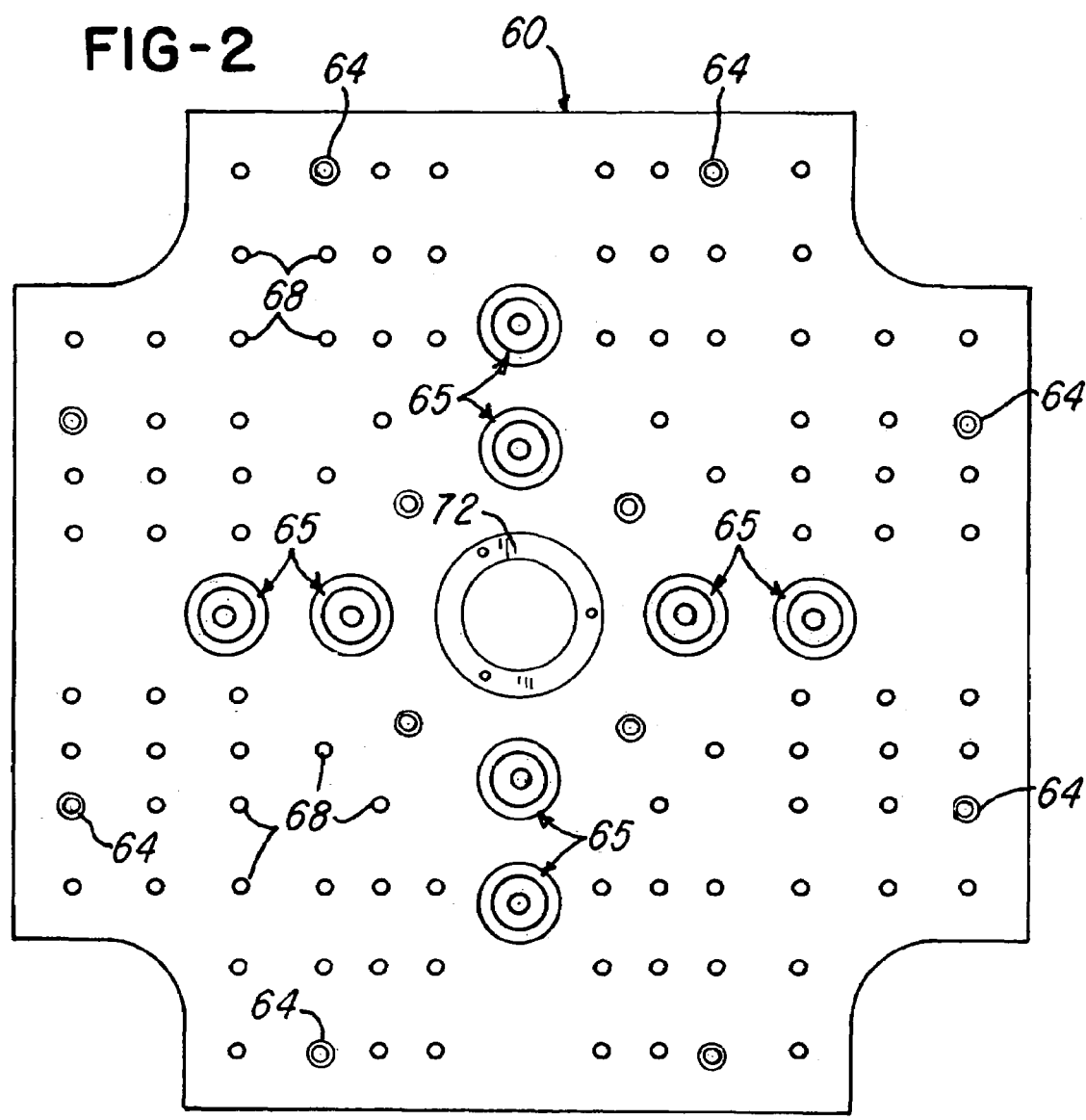
FIG. 2 is a view of an adapter plate used in the quick-change mounting system shown in FIG. 1 of the invention and taken generally on the line 2-2 of FIG. 1.

As also shown in FIG. 2, the adapter plate 60 supports a plurality of quick-change locking couplers 65 which are recessed within the plate 60. One set of four locking couplers 65 are illustrated for supporting, locating and attaching the mold section 12, and an outer set of four locking couplers 65 are provided for supporting, locating and attaching another mold section larger than the mold section 12. The adapter plate 60 also has a pattern or an array threaded holes 68 which may be used for attaching a mold section in a conventional manner with machine screws or bolts which extend through the mold section and are threaded into the holes 68. As shown in FIG. 1, the adapter plate 60 also carries a hardened locating ring 72 which receives a smaller locating ring 74 partially recessed within the center portion of the mold section 12 around the sprue bushing 28.

Each of the locking couplers 65 is preferably of the type manufactured and sold by Edward D. Segen & Co., LLC of Milford, Conn. and referred to in its catalog as a "Quick-Change Cylinder Lock". Each of the couplers 65 includes a metal knob or stud 82 (FIG. 4) having a circumferential end flange portion 83 attached to the mold section 12 by a retaining ring 84 secured within a counterbore in the mold section 12 by a set of circumferentially spaced screws (not shown). Each of the studs 82 projects outwardly from the mold section 12 perpendicular to the platens and has a tapered or frusto-conical base portion 86 integrally connected to an enlarged head portion 87 by a cylindrical neck portion 88 of reduced diameter.

Each coupler 65 also includes a female portion in the form of a cup-shaped cylinder 92 having an annular end portion 94 with an internal tapered surface which mates with the tapered outer surface of the base portion 86 of the stud 82. The end portion 94 of the cylinder 92 has circumferentially spaced counterbores which receive machine screws 96 for securing the end portion 94 within a counterbore within the adapter plate 60. Each cylinder 92 also has an inner end portion 101 which defines a cavity for receiving the enlarged head portion 87 of the stud 82. A plurality of hardened steel locking balls 104 are retained within corresponding circumferentially spaced holes within the cylinder 92 for corresponding radial movement.

Figure 3:
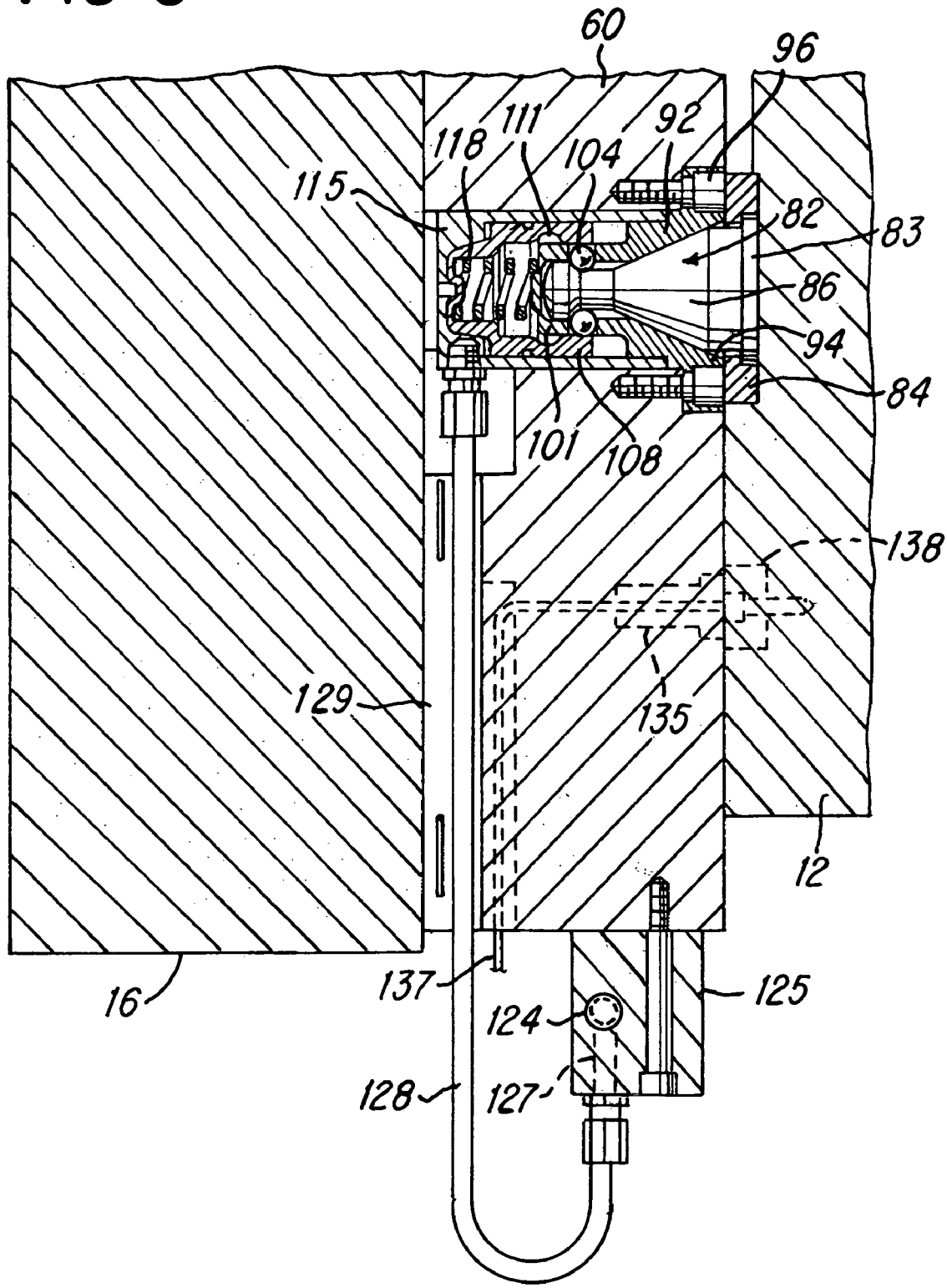
FIG. 3 is an enlarged fragmentary section of the quick-change mounting system and showing a quick-change locking coupler in its locked position for locking a mold section to its supporting platen.
Figure 4:
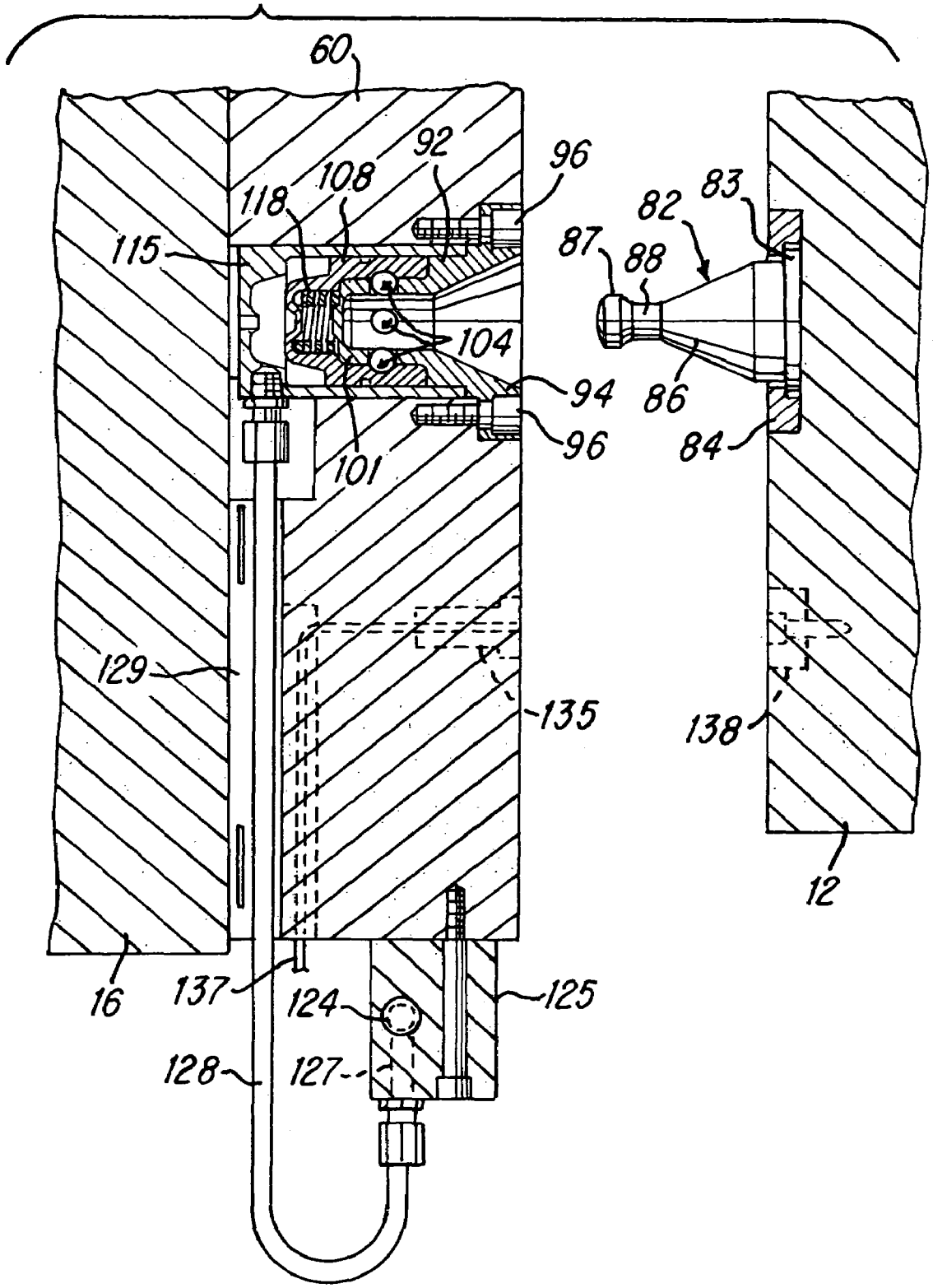
FIG. 4 is a fragmentary section similar to FIG. 3 and showing a locking coupler in its released position and with the mold section spaced from the adapter plate and locking couplers.

A cup-shaped piston 108 surrounds the portion 101 of each cylinder 92 and has a circumferentially extending internal groove or recess 111 for receiving the balls 104 in retracted positions when the piston 108 is in its released position (FIG. 4). A cylindrical cup-shaped housing 115 surrounds the piston 108 and has an outer end portion secured or bonded by adhesive to the annular portion 94 of the cylinder 92. The housing 115 confines and supports the piston 108 for axial movement between a released position (FIG. 4) with the balls retracted and a locked position (FIG. 3) when the balls 104 are cammed radially inwardly to engage the head portion 87 of the stud 82. A compression spring 118 extends between the inner end wall of the cylinder 92 and a bottom end wall 120 of the piston 108 and normally urges the piston 108 inwardly to the locked position (FIG. 3) of the coupler 65.

When it is desired to move the pistons of the couplers 65 to their released positions (FIG. 4), pressurized fluid or air is supplied simultaneously to all of the couplers 65 with an adapter plate 60 from a pressurized air passage 124 within a manifold 125 (FIG. 4) secured to the plate. The passage 124 is connected to the housing 115 of each of the couplers 65 by a corresponding passage 127 within the manifold 125 and within a corresponding air supply tube 128 recessed within a groove 129 in the plate 60 and connecting the manifold 125 to each of the housings 115. Preferably, one of the studs 82 is rigidly connected to the mold section 12 by a tight fit of an attachment ring 84 or by a threaded end portion, and the remaining studs 82 are attached to the mold section 12 for slight lateral movement by providing the attachment ring 84 with a few thousandth clearance between the ring 84 and the stud 82. Thus the one stud 82 which is rigidly connected to the mold section 12 to provide for precisely locating the mold section on the adapter plate 60. The slight lateral or floating movement of the remaining studs 82 provide for positively locking the mold section 12 to the adapter plate 60 but permit thermal expansion of the mold section relative to the adapter plate and platen. The lateral movement also provides for positioning of the remaining studs 82 within the mold section 12 and for positioning the remaining cylinders 92 within the adapter plate 60 within manufacturing tolerances.

Another adapter plate 60' with recessed locking couplers 65 is used to mount the movable mold section 14 including the mounting plate 52 to the movable platen 22 of the molding press. The studs 82 may be connected to the mounting plate 52 by threaded end portions 132 or the studs 82 may be attached to the mounting plate 52 by attachment rings 84 in a manner as described above for attaching the studs 82 to the mold section 12.

Referring to FIGS. 3 and 4, a sensor switch 135 is recessed within each of the adapter plates 60 and 60' and has electrical conductors 137 connected to the control circuit for the molding press. One form of sensor switch which may be used is an inductive-type proximity sensor switch produced by Balluff. A metallic sensor pad 138 is recessed within the mold section 12 and within the mold mounting plate 52 in alignment with the corresponding sensor switch 135. The sensor switch 135 assures that the injection molding press will not operate until the mold sections 12 and 14 are precisely located and positively locked to the corresponding adapter plates 60 by the locking couplers 65.

When it is desired to load a mold 10 into the molding press, the mold 10 is lowered into position between the platens 16 and 22 using support straps from an overhead crane or other loading mechanism. Pressurized air is supplied to all of the couplers 65 on both adapter plates 60 from the manifolds 125 through the tubes 128 so that all of the pistons 108 moved to their released positions (FIG. 4). The mold section 12 is then guided into position where all of the supporting studs 82 on the mold section 12 are inserted into the corresponding cylinders 92 within the couplers 65 recessed within the adapter plate 60 mounted on the stationary platen 16. The pressurized air within the housings 115 is then released so that all of the pistons 118 move to their locked positions (FIG. 3) thereby locking the mold section 12 to the stationary platen 16.

While the mold 10 is still being supported by the straps, the moveable platen 22 is moved to the left (FIG. 1) until all of the studs 82 projecting from the mounting plate 52 are received within the corresponding cylinders 92 within the adapter plate 60' secured to the moveable platen 22. The pressurized air within the corresponding lines 128 is then released so that the mold section 14 including the mounting plate 52 are positively locked to the moveable platen 22 by the corresponding locking couplers 65. The mold support straps are then removed, and the press is ready for operation. The sensors 135 are connected to send signals to the press controller to confirm that the mold 10 is in place and firmly seated against the adapter plates 60 and 60'. If the signal is not received from both sensors 135, the press will not operate.

From the drawings and the above description, it is apparent that a quick-change mold mounting system constructed in accordance with the invention, provides desirable features and advantages. For example, the locking couplers 65 provide for precisely and quickly positioning the mold sections 12 and 14 with precision alignment to their supporting platens 16 and 22, respectively. The locking couplers 65 also provides for positively and quickly locking the mold sections to the platens and unlocking the mold sections so that the mold may be quickly interchanged, and down time of the press is minimized. The quick-change mold mounting system of the invention may also be used with metal and non-metal molds and with molds having non-magnetic surfaces. In addition, the pattern of threaded holes 68 and holes 64 for locating pins within each adapter plate 60 and 60' provide for mounting conventional mold sections in a conventional manner with clamping plates and/or screws or bolts. This is desirable when all of the molds used within a press are not provided with projecting studs 82. It is also within the scope of the invention to recess the quick-change locking couplers 65 directly within the platens 16 and 22 and thereby eliminate the need for the adapter plates 60 and 60'. The controls of the pressurized air with the manifolds 125 may also be enclosed within a lock box to prevent accidental pressurization of the pistons 108 and release of the studs 82.

While the form of quick-change mold mounting system herein described constitutes a preferred embodiment of the invention, it is to be understood that the invention is not limited to the precise form described, and that changes may be made therein without departing from the scope and spirit of the invention as defined in the appended claims.

What is claimed is:

1. In a molding press adapted to produce a plastic part and including a stationary platen and a movable platen disposed in parallel spaced relation, and a first mold section and a second mold section cooperating to define at least one mold cavity therebetween, a quick-change mounting system for said first mold section and said second mold section, comprising a plurality of spaced quick-change locking couplers connecting said first mold section to said stationary platen and a plurality of spaced quick-change locking couplers connecting said second mold section to said movable platen, all of said locking couplers having parallel spaced axes, each of said locking couplers including a cylinder having peripherally spaced holes supporting a plurality of circumferentially spaced balls for corresponding radial movement, a plurality of axially projecting studs connected to each of said mold sections and having enlarged head portions projecting into corresponding said cylinders, a cup-shaped piston surrounding each said cylinder and having a recess for receiving said balls in a released position, a spring urging each said piston axially to a locked position with said balls engaging said head portion of the corresponding said stud, each of said couplers further including a housing supporting the corresponding said piston for axial movement, each of said pistons being movable axially against the corresponding said spring to said released position where said balls are received within said recess to release said studs and permit removal of said mold sections from the corresponding said platens, at least one of said studs is rigidly connected to the corresponding said mold section, and at least one of said studs is connected to the same said mold section for slight lateral movement.

2. A molding press as defined in claim 1 and including fluid passages connected to said housings of said locking couplers for at least one of said mold sections for simultaneously supplying pressurized fluid to said housings for simultaneously moving the corresponding said pistons to said released positions.

3. A molding press as defined in claim 1 and including an adapter plate disposed between one of said mold sections and the corresponding said platen and rigidly secured to said platen, and said cylinders and said housings of the corresponding said locking couplers are recessed within said adapter plate.

4. A molding press as defined in claim 3 wherein said adapter plate includes a predetermined pattern of threaded holes to provide for mounting a mold section to said adapter plate without using said locking couplers.

5. A molding press as defined in claim 3 and including fluid passages connected to said housings of said locking couplers for at least one of said mold sections for simultaneously supplying pressurized fluid to said housings for simultaneously moving the corresponding said pistons to said released positions.

6. A molding press as defined in claim 1 and including a sensor connected to control said press and positioned to detect when at least one of said mold sections is locked to the corresponding said platen by the corresponding said locking couplers.

7. A molding press as defined in claim 1 and including an air supply manifold connected to supply pressurized air simultaneously to all of said locking couplers connecting one of said mold sections to the corresponding said platen.

8. A molding press as defined in claim 1 wherein each of said studs has a frusto-conical outer locating surface, and each of said cylinders has a frusto-conical inner locating surface engaging said outer surface of the corresponding said stud.

9. In a molding press adapted to produce a plastic part and including a stationary platen and a movable platen disposed in parallel spaced relation, and a first mold section and a second mold section cooperating to define at least one mold cavity therebetween, a quick-change mounting system for said first mold section and said second mold section, comprising an adapter plate mounted on each said platen, a plurality of spaced quick-change locking couplers connecting said first mold section to said adapter plate on said stationary platen and a plurality of spaced quick-change locking couplers connecting said second mold section to said adapter plate on said movable platen, all of said locking couplers having parallel spaced axes, each of said locking couplers including a cylinder having peripherally spaced holes supporting a plurality of circumferentially spaced balls for corresponding radial movement, a plurality of axially projecting studs connected to each of said mold sections and having enlarged head portions projecting into corresponding said cylinders, a cup-shaped piston surrounding each said cylinder and having a recess for receiving said balls in a released position, a spring urging each said piston axially to a locked position with said balls engaging said head portion of the corresponding said stud, each of said couplers further including a housing recessed within one of said adapter plates and supporting the corresponding said piston for axial movement, a fluid passage extending to each said housing for moving the corresponding said piston axially against the corresponding said spring to said released position where said balls are received within said recess to release said studs and permit removal of said mold sections from the corresponding said adapter plates, at least one of said studs is rigidly connected to each of said mold sections. and at least one of said studs is connected to each of said mold sections for slight lateral movement.

10. A molding press as defined in claim 9 and including a manifold defining a fluid passage connected to said fluid passages extending to said housings of said locking couplers for each of said mold sections for simultaneously supplying pressurized fluid to said housings for simultaneously moving the corresponding said pistons to said released positions.

11. A molding press as defined in claim 9 wherein each said adapter plate includes a predetermined pattern of threaded holes to provide for mounting a mold section to said adapter plate without using said locking couplers.

12. A molding press as defined in claim 9 and including a sensor connected to control said press and positioned to detect when at least one of said mold sections is locked to the corresponding said adapter plate by the corresponding said locking couplers.

13. A molding press as defined in claim 9 wherein at least one of said studs on each of said mold sections has an outwardly projecting flange, and an attachment ring securing said flange to the corresponding said one mold section.

14. A molding press as defined in claim 13 wherein said flange is supported by said ring for slight lateral movement of said one stud.

15. A molding press as defined in claim 9 wherein each of said studs has a frusto-conical outer locating surface, and each of said cylinders has a frusto-conical inner locating surface engaging said outer surface of the corresponding said stud.

16. In a molding press adapted to produce a plastic part and including a stationary platen and a movable platen disposed in parallel spaced relation, and a first mold section and a second mold section cooperating to define at least one mold cavity therebetween, a quick-change mounting system for said first mold section and said second mold section, comprising a plurality of spaced quick-change locking couplers connecting said first mold section to said stationary platen and a plurality of spaced quick-change locking couplers connecting said second mold section to said movable platen, all of said locking couplers having parallel spaced axes, each of said locking couplers including a cylinder having peripherally spaced holes supporting a plurality of circumferentially spaced balls for corresponding radial movement, a plurality of axially projecting studs connected to each of said mold sections and having enlarged head portions projecting into corresponding said cylinders, a cup-shaped piston surrounding each said cylinder and having a recess for receiving said balls in a released position, a spring urging each said piston axially to a locked position with said balls engaging said head portion of the corresponding said stud, each of said couplers further including a housing supporting the corresponding said piston for axial movement, each of said pistons being movable axially against the corresponding said spring to said released position where said balls are received within said recess to release said studs and permit removal of said mold sections from the corresponding said platens, at least one of said studs on one of said mold sections has an outwardly projecting flange, and an attachment ring securing said flange to said one mold section.

17. A molding press as defined in claim 16 wherein said flange is supported by said ring for slight lateral movement of said one stud.

\* \* \* \* \*